United States Patent
Bentley et al.

(10) Patent No.: US 7,458,055 B2
(45) Date of Patent: *Nov. 25, 2008

(54) APPARATUS, SYSTEM, METHOD, AND PROGRAM FOR FACILITATING THE DESIGN OF ELECTRONIC ASSEMBLIES

(75) Inventors: Stanley Loren Bentley, Indianapolis, IN (US); Charles Mark Henthorn, Indianapolis, IN (US); Elaine Marie Heazeltine, Indianapolis, IN (US); Tammie Lynn Bentley-Fish, Carmel, IN (US)

(73) Assignee: Diversified Systems, Inc., Indianapolis, IN (US)

( * ) Notice: Subject to any disclaimer, the term of this patent is extended or adjusted under 35 U.S.C. 154(b) by 378 days.

This patent is subject to a terminal disclaimer.

(21) Appl. No.: 10/781,249

(22) Filed: Feb. 18, 2004

(65) Prior Publication Data
US 2005/0108663 A1 May 19, 2005

Related U.S. Application Data

(60) Provisional application No. 60/448,359, filed on Feb. 19, 2003.

(51) Int. Cl.
G06F 17/50 (2006.01)
G06F 19/00 (2006.01)
G06F 15/16 (2006.01)
G06F 17/00 (2006.01)

(52) U.S. Cl. .......................... 716/15; 716/11; 700/121; 709/203; 705/400

(58) Field of Classification Search ............ 700/95–97, 700/121, 103–107, 93; 709/203; 716/1, 716/8, 15, 11
See application file for complete search history.

(56) References Cited

U.S. PATENT DOCUMENTS

| 5,455,948 | A | 10/1995 | Poole et al. |
| RE36,602 | E * | 3/2000 | Sebastian et al. ............ 700/97 |
| 6,496,957 | B1 | 12/2002 | Kumagai |
| 6,560,770 | B1 | 5/2003 | Saxena et al. |
| 6,625,511 | B1 | 9/2003 | Suzuki et al. |
| 6,629,008 | B2 * | 9/2003 | Shiiba et al. ................. 700/100 |
| 6,634,008 | B1 * | 10/2003 | Dole ............................. 716/1 |
| 6,678,877 | B1 * | 1/2004 | Perry et al. .................... 716/15 |
| 6,832,122 | B1 * | 12/2004 | Huber .......................... 700/95 |
| 6,983,232 | B2 * | 1/2006 | Nguyen et al. ................. 703/7 |
| 6,996,599 | B1 * | 2/2006 | Anders et al. ............... 709/201 |
| 2002/0072956 | A1 | 6/2002 | Willems et al. |
| 2002/0078145 | A1 * | 6/2002 | Beran .......................... 709/203 |
| 2003/0046337 | A1 * | 3/2003 | Strahm et al. ............... 709/203 |
| 2003/0140097 | A1 * | 7/2003 | Schloer ....................... 709/203 |
| 2003/0163214 | A1 * | 8/2003 | Ouchi .......................... 700/97 |

(Continued)

OTHER PUBLICATIONS

"New Models to Spped the Development of Electronics Components", Mar. 1999, PREAMP Consortium (Joint Venture), Paper on Manufacturing, 3 pgs.

(Continued)

Primary Examiner—Stacy A Whitmore
(74) Attorney, Agent, or Firm—Barnes & Thornburg LLP

(57) ABSTRACT

An apparatus, system, method, and program for facilitating the design of electronic assemblies include transmitting a user interface application to a user over a publicly-accessible global network. The user interface application is updated in response to electronic assembly design data entered by the user.

44 Claims, 10 Drawing Sheets

U.S. PATENT DOCUMENTS

| | | |
|---|---|---|
| 2003/0167453 A1* | 9/2003 | Smith et al. .................... 716/15 |
| 2003/0178388 A1 | 9/2003 | Phillips |
| 2003/0191799 A1* | 10/2003 | Araujo et al. ............... 709/203 |
| 2004/0208354 A1* | 10/2004 | Vilella ........................ 382/145 |
| 2004/0210330 A1* | 10/2004 | Birkle ......................... 700/96 |
| 2004/0268299 A1 | 12/2004 | Lei et al. |

OTHER PUBLICATIONS

"CALS Technical Goal 2", 1997 Sweedish Defense Material Administration, pp. 1-239.

* cited by examiner

Fig. 10

APPARATUS, SYSTEM, METHOD, AND PROGRAM FOR FACILITATING THE DESIGN OF ELECTRONIC ASSEMBLIES

This application claims priority under 35 U.S.C. § 119(e) to U.S. Provisional Application Ser. No. 60/448,359, filed on Feb. 19, 2003, the entirety of which is hereby incorporated by reference herein.

CROSS REFERENCE

Cross reference is made to copending U.S. patent application Ser. No. 10/780,990 entitled "Apparatus, System, Method and Program for Facilitating the Design of Bare Circuit Boards" by S. Bentley, et al. which is assigned to the same assignee as the present application, is filed concurrently herewith, and is hereby incorporated by reference.

FIELD OF THE DISCLOSURE

The present disclosure relates generally to a network-based system, and more particularly to a network-based system for facilitating the design of an electronic assembly.

BACKGROUND OF THE DISCLOSURE

An electronic assembly typically includes a printed circuit board having a relatively large number of electronic components mounted thereon. The electronic components of the assembly may take on a variety of different shapes and sizes and may be mounted to the circuit board in a variety of different ways. For example, complex integrated circuit packages may be die mounted onto the board using a ball-grid array, whereas mechanical connectors and the like may be mounted by use of through hole leads. Other components such as SOIC's, SOT's, and surface mounted resistors and capacitors may be surface mounted on the top or bottom side of the board and soldered using either reflow or wave soldering techniques.

The layout and design of electronic assemblies can be a relatively complex task. Indeed, designers are often faced with problems such as insufficient board "real estate," conflicts with design standards, product cost constraints, etcetera. For example, during the layout and design of an assembly, the designer may run out of room for the components to be mounted on the topside board, yet the designer does not have all of the parts placed on the topside of the board. Moreover, the current design guidelines under which the designer is operating may state that, for example, surface mounted chips are not to be placed on the bottom side of the board. Hence, the designer is faced with the choice of either (1) putting surface mounted chips on the bottom side thereby violating the design guidelines in addition to increasing the cost of the assembly, (2) increasing the size of the board thereby increasing its cost, or (3) increasing the "technology level" of the assembly with smaller components thereby also increasing the cost of the assembly.

In light of the fact that each of the above-identified options increases the cost of the assembly, the designer must determine which of the options will yield the most cost effective solution to the problem. In other words, the designer is challenged with finding the solution to his or her problem that increases the cost of the assembly by the least amount. In reality, of course, there is no universal solution to such a problem. Each situation is generally unique. In practice, the typical way to explore the designer's options is to have a circuit board vendor and an assembler quote each different option and then compare them. Unfortunately, getting these vendors to allow access to quoting resources with no prospect for an order is often difficult. There is no way the designer can do this for herself or himself.

Hence, the designer often takes her or his "best guess" at a solution to the design dilemma. The design is then presented to a supply base of vendors to determine the cost of the product based on the design. Often the "real" cost of the product based on the design exceeds the marketing expectations resulting in costly redesign efforts to reduce the cost.

SUMMARY OF THE DISCLOSURE

According to one illustrative embodiment, there is provided a system for facilitating the design of electronic assemblies. When a user (e.g., a design engineer, or simply "designer") logs onto the system, she or he may enter design information about an electronic assembly and monitor the running cost of the assembly as the designer modifies the parameters of the design. As such, the designer may evaluate design decisions in "real time," while also obtaining an estimate of the production cost of a new design.

Such a system may be implemented on a network. The network may be a global, publicly-accessible network such as the Internet. Access to the system may be password protected.

Such a system may use costing information derived from the manufacturer of the electronic assembly to produce the running cost which is displayed to the designer. Such a system may also compare the design parameters input by the designer to the manufacturer's process capabilities to monitor the manufacturability of the design.

The above and other features of the present disclosure will become apparent from the following description and the attached drawings.

BRIEF DESCRIPTION OF THE DRAWINGS

FIGS. 4-10 are screen displays of a user interface application which is displayed to a user on a display monitor during performance of the routine of FIG. 2.

DETAILED DESCRIPTION OF AN ILLUSTRATIVE EMBODIMENT

Figure 1:
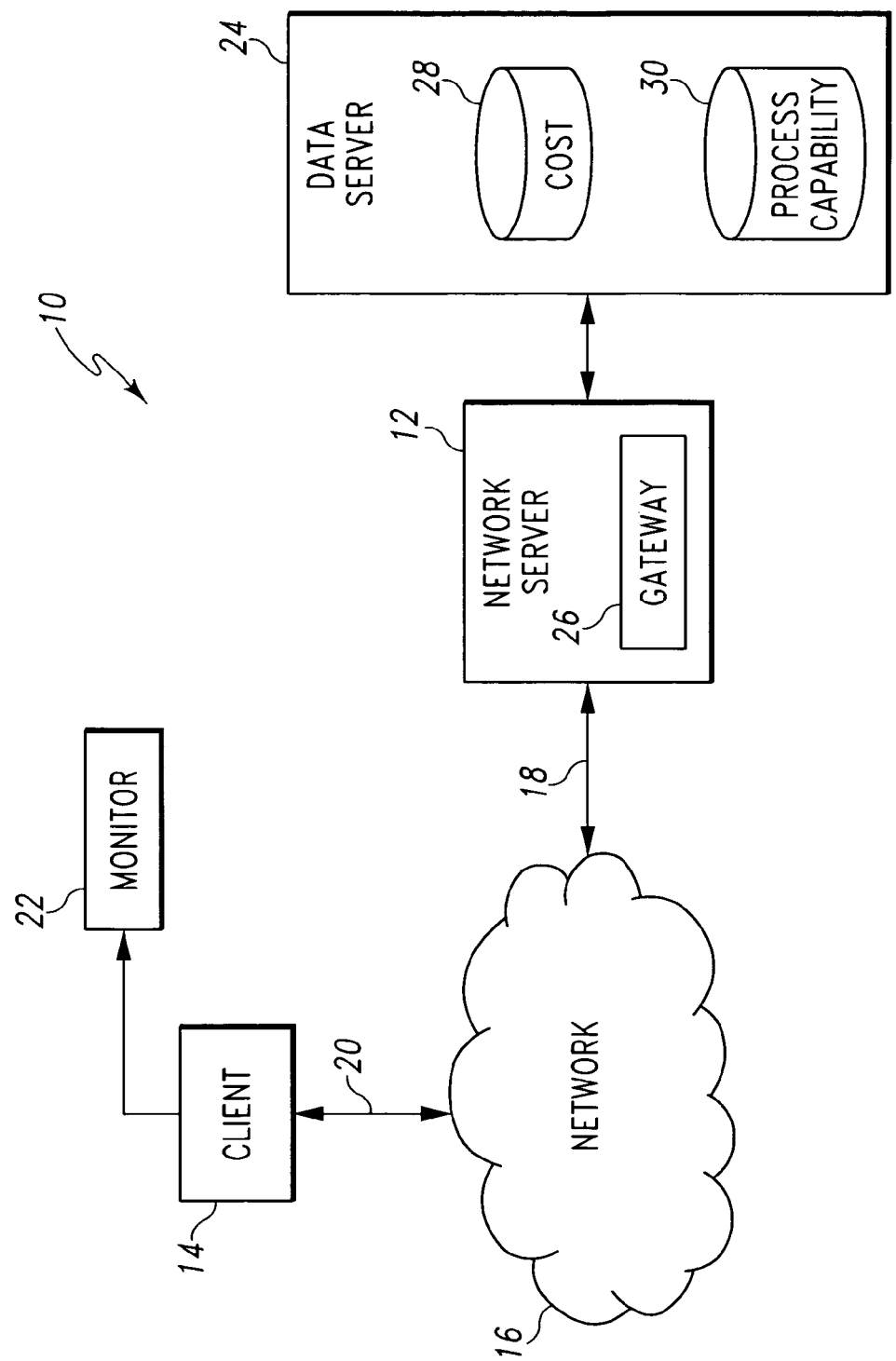
FIG. 1 is a simplified block diagram of a network-based system which incorporates the features of the present disclosure therein.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

The present disclosure is directed to an apparatus, method, system, and program for facilitating the design of electronic assemblies. In essence, the concepts disclosed herein allow a user such as a designer to compare a number of different design options prior to committing the design to final form. In such a way, comparisons between different design alternatives can be made upfront by the designer thereby reducing costs and cycle times. In the exemplary embodiment described herein, the "user" is described as a design engineer, or simply "designer." However, it should be appreciated that a designer is but one example of a user and such a description is not intended to limit the scope of the disclosure to one particular type of user, but rather on the contrary, the concepts disclosed herein may be used by any type of user.

As shown in FIGS. 4-10, a number of data entry screens are presented to a designer via an interface device such as a display monitor of a personal computer (PC). The designer may navigate throughout the screens and enter relevant information pertaining to one or more electronic assembly designs by operating an input device such as the PC's mouse or keyboard. In response to this input, cost data associated with the various parameters of the electronic assembly design is retrieved from a cost database, assembled into a cost estimate, and displayed to the designer. Moreover, the design parameters input by the designer are also compared to a set of rules relating to assembly process capabilities stored in a process capability database to determine if any of the design parameters input by the designer are approaching or exceeding the vendor's capabilities. For example, if the designer enters a surface mounted chip to be placed that is has a size or shape that is outside of the board manufacturer's chip placement capability, a message indicating such a conflict is generated and displayed to the designer.

In such a way, a designer can enter a number of "what if" scenarios and monitor the impact that each scenario has on the cost of the assembly. Moreover, the designer can also determine if any of such scenarios are outside of the capabilities of the assembly manufacturer. As such, the restrictions associated with a designer's need to commit to a design without knowing the cost and manufacturability ramifications for doing so are eliminated.

To do so, in regard to one illustrative embodiment, as shown in FIG. 1, a network-based system 10 has a network server machine 12 which communicates with a client machine 14 via a network 16. A data server 24 is coupled to the network server 12. Typically, the network server 12 and the data server 24 are operated and/or maintained by an electronic assembly manufacturer, whereas the client machine 12 is under the control of the designer. Although only one network server 12, one client 14, and one data server 24 are shown in FIG. 1, it should be appreciated that the system may include any number of network servers 12, clients 14, or data servers 24.

In a conventional manner, each of the network servers 12, the clients 14, and the data servers 24 includes a number of components commonly associated with such machines. For example, although not shown in detail in the drawings, each of the network servers 12, the clients 14, and the data servers 24 may include, amongst other things customarily included in such machines, a central processing unit ("CPU"), a non-volatile memory such as a read only memory ("ROM"), a volatile memory such as a random access memory ("RAM"), and one or more data storage devices. It should also be appreciated that such components may be integrated into a single housing or may be provided as a number of separate, discrete devices. It should also be realized that the network server 12, the client 14, and the data server 24 may be operated with known, commercially available software operating systems.

As such, the network server 12 may be embodied as any type of commercially available network server. The storage devices associated with the network server 12 maintain a number of databases and files which are utilized in the construction and operation of an information portal such as a website. As will be described in greater detail below, the network server 12 also functions as a gateway 26 for exchanging information across networks that are incompatible and that use different protocols. The gateway 26 may be embodied as any combination of commercially available hardware and/or software that connects different types of networks such that information can be exchanged therebetween.

Similarly, the data server 24 may be embodied as any type of commercially available data server. The storage devices associated with the data server 24 maintain a number of databases and files which are utilized in the construction and operation of the system. In particular, as will be described in greater detail herein, the data server 24 maintains one or more cost databases 28 which include cost data associated with an electronic assembly fabrication process. The data server 24 also maintains one or more process capability databases 30 which include capability data associated with the electronic assembly fabrication process. Such capability data may be in the form of rule sets which require product dimensions and/or the tolerances associated therewith to be within prescribed ranges. It should be appreciated that although described herein as being separate databases, the cost database 28 and the process capability database 30 may be integrated into a single database, if desired. In addition, the databases 28, 30 may be "hard coded" in a user interface application thereby forming a single application download.

It should be appreciated that although shown in FIG. 1 as being discrete components, a common component may be used as both the network server 12 and the data server 24. In particular, the functionality of both devices may be executed by a single machine utilizing the appropriate network and data storage software and hardware.

The client 14 preferably includes an output device such as a display monitor 22 for displaying a number of images to the designer. As such, the client 14 may be embodied as any type of commercially available computing device such as a personal computer ("PC"). Moreover, the client 14 may also be embodied as a "mobile" device such as a cellular phone, a mobile data terminal, a portable computer, a personal digital assistant ("PDA"), or some other device of similar kind.

As shown in FIG. 1, the network server 12 is coupled to the network 16 via a communication link 18, whereas the client 14 is coupled to the network 16 via a communication link 20. It should be appreciated that the each of the communication links 18, 20 may be provided as any number or type of data link including both wired and wireless data links. Moreover, it should also be appreciated that one or more intervening modems (not shown), data routers (not shown), and/or internet service providers ("ISPs") (not shown) may be used to transfer the data between the network server 12, the client 14, and the network 16.

The network 16 of the present disclosure may be embodied as any type of network such as a LAN or WAN. Moreover, in a specific illustrative embodiment, the network 16 is embodied as a publicly-accessible global network such as the internet.

A designer may utilize the client 14 to access information stored on the network server 12 (or on a device associated with the server 12). In the case of an internet-based system (i.e., the network 16 is embodied as the internet), the server 12 is embodied as a web server and, as such, hosts a website which may be accessed by the designer from the client 14. In such cases, access to the website may be password protected thereby restricting access to website to those designers registered with the host (i.e., the electronic assembly manufacturer hosting the website). In any event, once a designer accesses the website, a user interface application is downloaded from the server machine 12 to the client machine 14 via the network 16 for display to the designer on the display monitor 22. In one specific embodiment, the databases 28, 30 are hard coded in the user interface application and are downloaded from the server machine 12 to the client machine 14 contemporaneously with the user interface application.

The designer may then peruse the contents of the user interface application and enter information relating to an electronic assembly design. In particular, the designer may navigate around the user application and enter information relating to a design of an electronic assembly such as, for example, the physical dimensions of the assembly, the number of surface mounted and/or through hole components of the assembly, the quantity of assemblies needed, the turnaround time required to produce the assembly, the thickness of conformal coat, if any, to be applied to the assembly, the number of different surface mounted and/or through hole components, the dimensions of the components to be surface mounted on the board (e.g., 1206's, 0805's, 0603's, etcetera), the need for electrical and/or functional testing, and so on. The designer may input such information by use of the client machine's input devices (e.g., the mouse and keyboard).

In response to the user-supplied electronic assembly design information, the client 14 may query the cost databases 28 or other data repositories downloaded from the server 12 and stored on the client 14 and retrieve cost data associated with the designer's input. Moreover, the client 14 may also query the process capability database 30 or other data repositories to determine if the data input by the designer is indicative of a design requirement that either approaches or even exceeds the process capabilities of the electronic assembly manufacturer. Once the client 14 has retrieved the appropriate information from the databases 28, 30, the client 14 utilizes the information to display to the designer a number of images (both text and graphical) in the form of an updated user interface which includes both the cost data and manufacturability data associated with the assembly design.

In embodiments in which the databases 28 and 30 are stored on a remote data server 24 (i.e., versions of the databases 28, 30 are not hard coded into the user interface application or otherwise downloaded to the client 14), the client 14 generates an output signal indicative of the user's input in response to the user-supplied electronic assembly design information. The client 14 transmits the output signal to the network server 12 via the network 16. The server 12 then forwards the information to the data server 24 which analyzes the data input by the designer and determines an appropriate response thereto. In particular, the data server 24 may query the cost databases 28 or other data repositories to determine and retrieve cost data associated with the designer's input. Moreover, the server 24 may also query the process capability databases 30 or other data repositories to determine if the data input by the designer is indicative of a design requirement that either approaches or even exceeds the process capabilities of the assembly manufacturer. Once the appropriate information has been located in the databases 28, 30, data files associated with such information are retrieved from the databases 28, 30 and transmitted to the client 14 via the network 16. The client 14 then utilizes the contents of such files to display to the designer a number of images (both text and graphical) in the form of an updated user interface which includes both the cost data and manufacturability data associated with the assembly design.

As described, the contents of the databases 28, 30 (both as maintained on the data server 24 and hard coded in the user interface application) are utilized to provide dynamic updates to the designer based on the design specifications being entered by the designer. To do so, the databases 28, 30 contain costing data associated with the manufacturer's operation. In particular, a manufacturer of electronic assemblies may utilize a costing structure in which the cost per assembly is calculated as a function of the assembly's characteristics. Hence, when such characteristics are entered by the designer, the data stored in the cost database 28 may be used to calculate the cost of the electronic assembly.

For example, the electronic assembly manufacturer's operation may be divided into a plurality of work centers each of which represents a certain step or phase of the assembly process. Data in the form of, for example, fixed or variable multipliers for each cost center are stored in the cost database 28. Hence, when information relating to a particular design of an electronic assembly is entered by the designer, the cost per work center may be calculated based on such information. Moreover, the time required in each work center of the assembly process may also be estimated based on the design. Typically, the longer the processing time, the more expensive the design is to produce. Hence, such timing information may be calculated and converted into cost data and stored in the cost database 28.

The cost database 28 also includes cost data associated with different assembly technology types as well. For example, cost data associated with component types (e.g., surface mounted or through hole components), IPC Class, etcetera are stored in the cost database 28. As a result, for example, should the designer want to know the cost penalty for converting a design having components mounted only on the component side of the board to a design having components on both the component and solder side of the board, the designer simply changes the fields corresponding to such information and watches as the cost figure (and the tooling figure) increases since cost generally increases as the design increases from having only a single side populated with components to having both sides populated with components. It should be appreciated that such an increase in the number of populated sides of the board will likely also increase the cost in one or more other work centers since the fabrication of assemblies with two populated sides is typically more complex relative to assemblies with only a single populated side.

The total cost of the assembly may be calculated by summing the cost of each of the work centers and the material costs. It should be appreciated that the total cost may change with each entry the designer makes (once enough information has been entered to begin a calculation). As such, the designer may receive immediate feedback as to the cost impact of the changes being made to the design of an electronic assembly.

It should appreciated that the cost database 28 may be arranged in any format desired to fit the needs of a given system. The format described herein (i.e., a cost amount driven by individual work center costs) is merely exemplary in nature.

The process capability database 30 includes data related to the process capabilities of the manufacturer of the electronic assembly. In particular, the database 30 may include a number of rule sets which are used to flag or otherwise identify any violations or near-violations of the manufacturer's process capabilities. Information associated with any violations or near-violations of the manufacturer's process capabilities are communicated to the designer. Moreover, certain violations or near-violations of the manufacturer's capabilities may not completely preclude the manufacturer from building the design, but rather may create a yield or cost penalty. In these cases, any such yield or cost penalty is considered in the calculation of the board cost.

Figure 2:
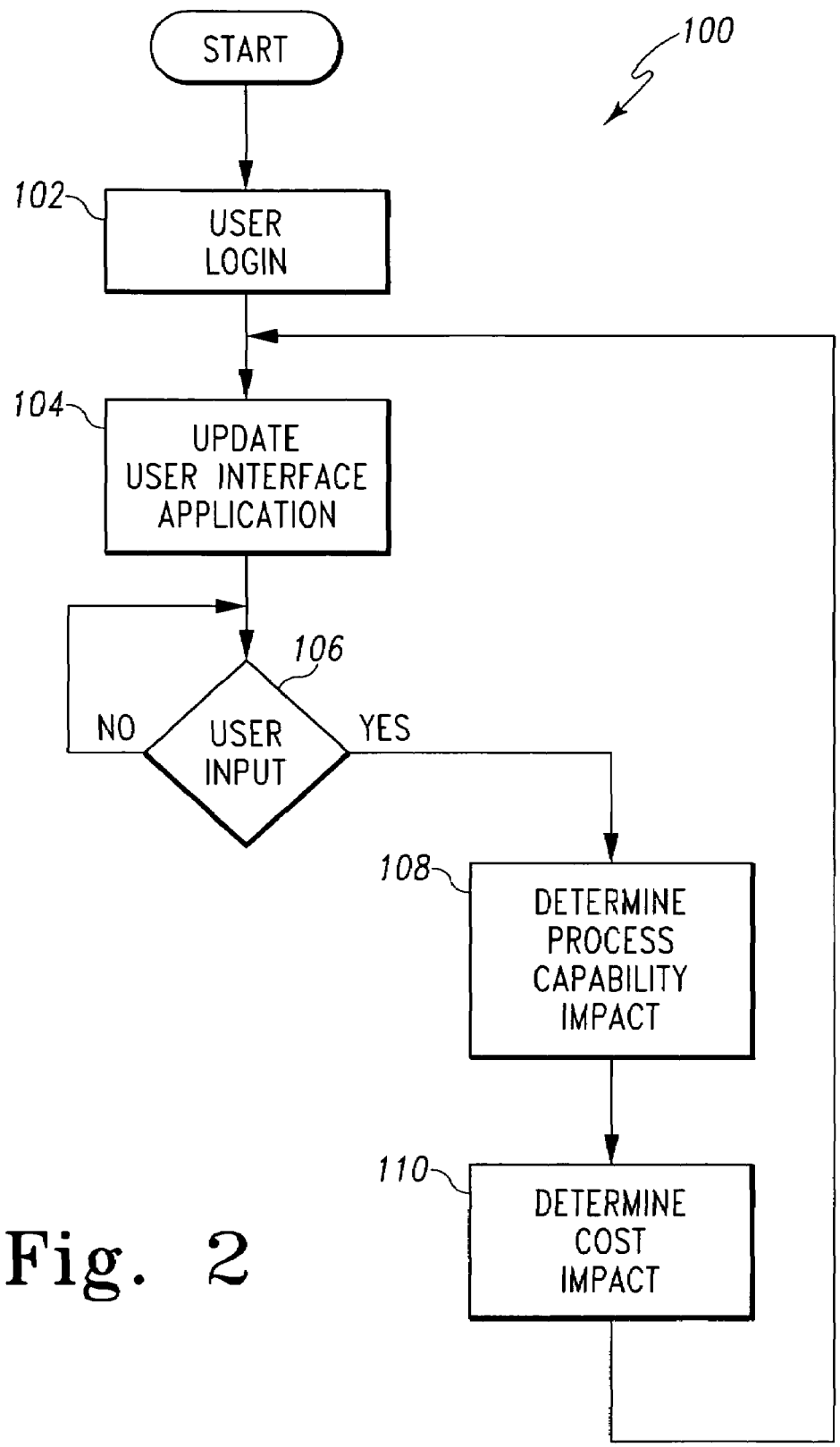
FIG. 2 is a flowchart of a routine for facilitating the design of an electronic assembly utilizing the system of FIG. 1.

Referring now to FIG. 2, there is shown a simplified flowchart which describes an exemplary routine 100 for facilitating the design of an electronic assembly in the manner described above. The routine 100 commences with step 102 in which the designer logs in to the system. In particular, the designer inputs a network address into, for example, a web browser software client running on client machine 14 thereby causing the client machine to be directed to the electronic assembly manufacturer's web server 12 via the network 16. The web server 12 responds to this by generating a log-in screen which is displayed to the designer on the display monitor 22 of the client machine 14. The designer then enters her or his user name and password into the log-in screen, and this user name and password are transmitted to web server 12 for validation. At this point, the web server 12 may set a cookie on the client machine 14, as is known in the art. Furthermore, the web server machine 12 determines whether or not the user name and password are valid. If the user name and password are not valid, the web server 12 may allow the designer to try logging in again. However, if the user name and password are valid, then the routine 100 proceeds to step 104.

Once designer is logged in, a graphical representation in the form of a user interface application is transmitted to the client 14 in step 104. The databases 28, 30 may also be transmitted to the client 14 by being hard coded in the user interface application or as separate databases. The user interface application may also include, amongst numerous other things, a number of data input fields for receiving user-input in the form of design characteristics associated with the design of a given electronic assembly. Such design characteristics may take the form of numerical data such as quantities, dimensions, tolerances, weights, timing, and the like. Such design characteristics may also take the form of non-numerical data such as "YES/NO" answers to queries presented to the designer, material types, testing requirements, technology types, and the like. Data may be entered into each data input field by use of a keyboard coupled to the client 14 or by choosing a selection from a menu of choices provided to the designer.

Moreover, the user interface application may also include a number of output fields or graphical representations for displaying or otherwise communicating data or other types of information to the designer. For example, the user interface application may include a field for communicating to the designer the cost-per-unit of the design input by the designer. The interface application may also include a field for communicating to the designer the cost associated with the fixtures and/or programming required to fabricate the design input by the designer. The interface application may further include a graphical or text representation which communicates to the designer any violations, near violations, or potential violations of the manufacturer's process capabilities based on the design of the electronic assembly input by the designer.

It should be appreciated that when the designer initially logs in, the data input fields of the user interface application are either empty (i.e., devoid of information) or set to a default setting such as recommended or average data values. However, the designer may navigate through the screens associated with the user interface application and enter information relating to her or his design of an electronic assembly. In particular, the designer may enter information into the empty fields and/or change some or all of the default settings (if the designer does not want a particular default setting). As shown in step 106 of FIG. 2, when the designer enters information relating to her or his assembly design into one of the data input fields associated with the user interface application, a request for updated information is generated.

In response to the request, the user interface application queries the databases 28, 30 to obtain the necessary information to update the user interface application. In particular, the user interface application may query the process capability database 30 to obtain information necessary to make a determination as to if the data input by the designer violates or nearly violates any one or more of the process capabilities of the board manufacturer (step 108). Contemporaneously, the user interface application may also query the cost database 28 to obtain information necessary to make a determination as to any impact on the board cost and/or fixture/tooling cost caused by the data input by the designer (subroutine 110).

In the embodiments in which the databases 28, 30 remain stored on the data server 24 (i.e., versions of the databases 28, 30 are not hard coded into the user interface application or otherwise downloaded to the client 14), the request for updated information is transmitted through the network 16 to the gateway 26. The gateway 26 forwards the request to the data server 24. The data server 24 then queries the databases 28, 30 to obtain the necessary information to update the user interface application. Such information is retrieved from the databases 28, 30 and transmitted to the network gateway 26. The gateway subsequently forwards the data to the client 14 through the network 16.

Figure 3:
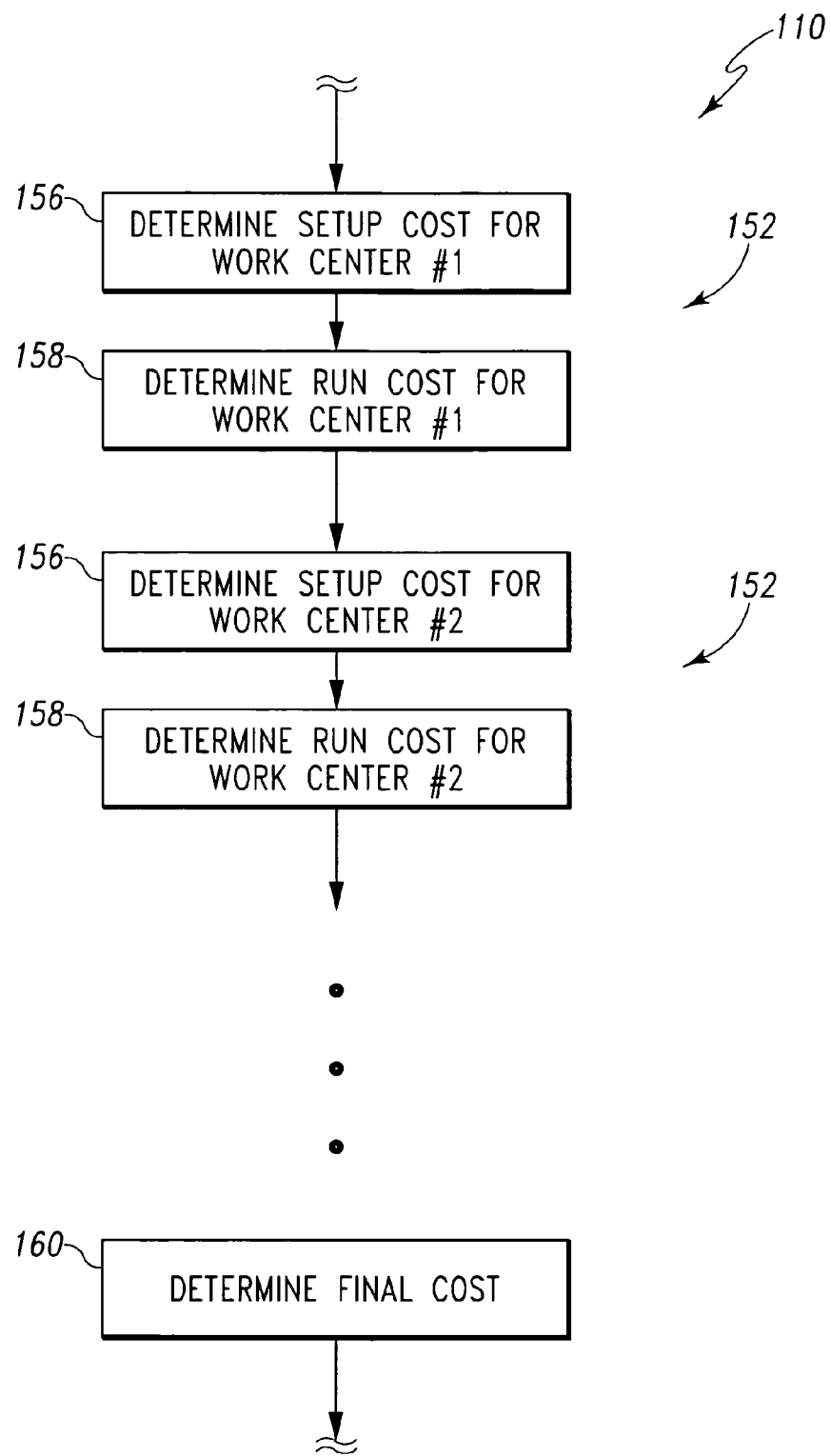
FIG. 3 is a flowchart of a subroutine for determining a cost value associated with the routine of FIG. 2.

As shown in FIG. 3, a subroutine 110 may be used to determine such a cost impact. The cost determination subroutine 110 includes a number of cost computation processes 152. Each cost computation process 152 is associated with a particular work center. Generally, a work center includes a collection of similar assembly steps such as a number of component installation steps. However, a work center may also be defined as a specific assembly step such as a wave soldering step or, in fact, as any single or collection of steps of the overall electronic assembly manufacture or assembly process. An assembly process may include any number of work centers. Typically, the subroutine 110 includes a cost computation process 152 for each work center included in the assembly process. Each cost computation process 152 determines a per unit setup cost and a per unit run cost for the associated work center. Although the processes 152 are shown as executed in sequential order in FIG. 3, it should be appreciated that the processes 152 may be executed in any order, executed contemporaneously with each other, or selectively executed.

Each process 152 begins with a step 156 in which a setup cost for the associated work center is determined. The setup cost for each work center is based on a fixed setup cost value, typically based on a setup time value and dependent upon the particular work center, multiplied by the number of assembly processing steps associated with the work center (e.g., the number of components installed, the total number of unique components, the number of solder joints, etc.). For example, a work center in which thirty resistors are placed on a circuit board may have a setup cost which is defined as a fixed setup cost value multiplied by thirty (30).

The setup cost is a one time cost value associated with the work center and is not dependent on the number of electronic assemblies to be assembled. Accordingly, the setup cost is divided by the total number of electronic assemblies in the overall assembly process to arrive at a per unit setup cost value.

Each process 152 also includes a step 158 in which a run cost for the associated work center is determined. The run cost for each work center is based on a fixed run cost value, typically based on a run time value, multiplied by the number of assembly process steps performed in the work center. For example, a work center in which thirty (30) resistors are placed on a circuit board may have a run cost value which is defined as a fixed run cost value multiplied by thirty (30). In work centers including single assembly process steps, such as a wave soldering process step, the run cost may be defined as a single fixed run cost value.

Regardless of the type of work center, the run cost is a cost applicable to each electronic assembly to be manufactured. Specifically, unlike the tool setup cost, the run cost is dependent on the number of electronic assemblies being assembled.

The final or "total" per unit cost value for the assembly process is determined in step 160. The final per unit cost value is the sum of a final per unit setup cost value and a final per unit run cost value. The final per unit setup cost value is determined by summing the per unit setup costs of each work center. The final per unit run cost value is determined by summing the run costs of each work center. In some embodiments, additional cost charges or cost discounts may be applied to either of the final setup cost and/or the final per unit run cost based on aspects or criteria of the electronic assembly design such as component type and availability, number of boards to be assembled, manufacturing or assembly difficulty, and the like.

A fixture/tooling cost is also determined in process step 160. The fixture/tooling cost is a fixed cost based on the overall assembly process. The fixture/tooling cost includes such costs as machine software design charges, special machine setup charges, additional design charges, and the like. Generally, the fixture/tooling cost is a cost applicable on a one time basis and, accordingly, subsequent assembly processes of the same electronic assembly design will not incur further fixture/tooling costs.

As shown in FIG. 2, once the requested data is extracted from the appropriate database 28, 30, and the necessary computations completed, the control routine 100 loops back to step 104 in which the user interface application is updated based on the cost data and process capability data. Such update may include displaying the cost data and/or the process capability data or otherwise altering the displayed user interface application based on the cost data and/or process capability data. The designer may then continue to navigate around the user interface application and continue inputting additional data associated with her or his board design.

An illustrative user interface application (designated with reference numeral 200) is shown in FIGS. 3-15. The user interface application 200 includes a cost-per-assembly display 202 and a fixture/tooling cost display 204. In alternative embodiments, the user interface application 200 may include additional displays to display a complete set of the setup and run costs associated with each work center. The final per unit cost value, as determined in process step 160 of subroutine 110, is displayed in the cost-per-assembly display 202. The application 200 also includes a process capability display 206. In the exemplary embodiment described herein, the process capability display 206 is embodied as a stop light having a RED, YELLOW, and GREEN "light."

Figure 4:
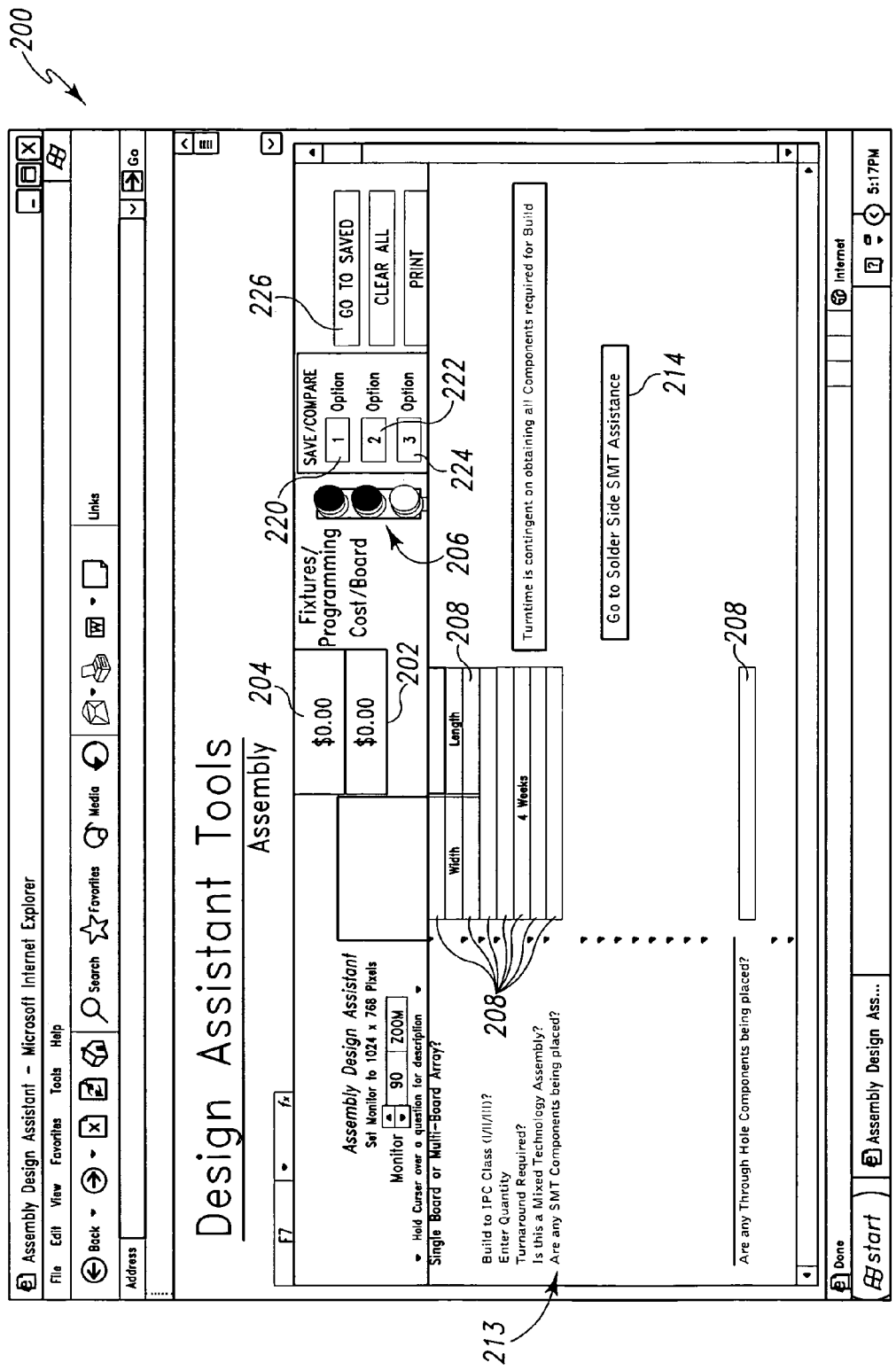

The user interface application 200 also includes a number of data input fields 208. As shown in FIG. 4, the data input fields 208 may be used by the designer to input design characteristics or other information about the designer's electronic assembly design. For example, by use of the data input fields 208, the designer may enter information relating to the physical dimensions of the board, the quantity of boards needed, the turnaround time for fulfilling the order, the IPC Class to which the assembly is to be built, information relating to the surface mount components, if any, that are included in the design (e.g., total number of unique components, size of the component, the number of hand-placed components, etcetera), and information relating to through hole components, if any, that are included in the design (e.g., the total number of unique components, total number of components—unique or not, type of through hole component, soldering method, etcetera). Other characteristics may also be input by the designer such as whether the design utilizes conformal coating, standoffs, swaged items, or a housing, whether in-circuit testing is needed, whether the board is to be functional tested, or whether there are rails to be removed from the assembly. The user interface application may also be configured to accept data relating to other characteristics to fit the needs of a given assembly process or vendor.

Figure 5:
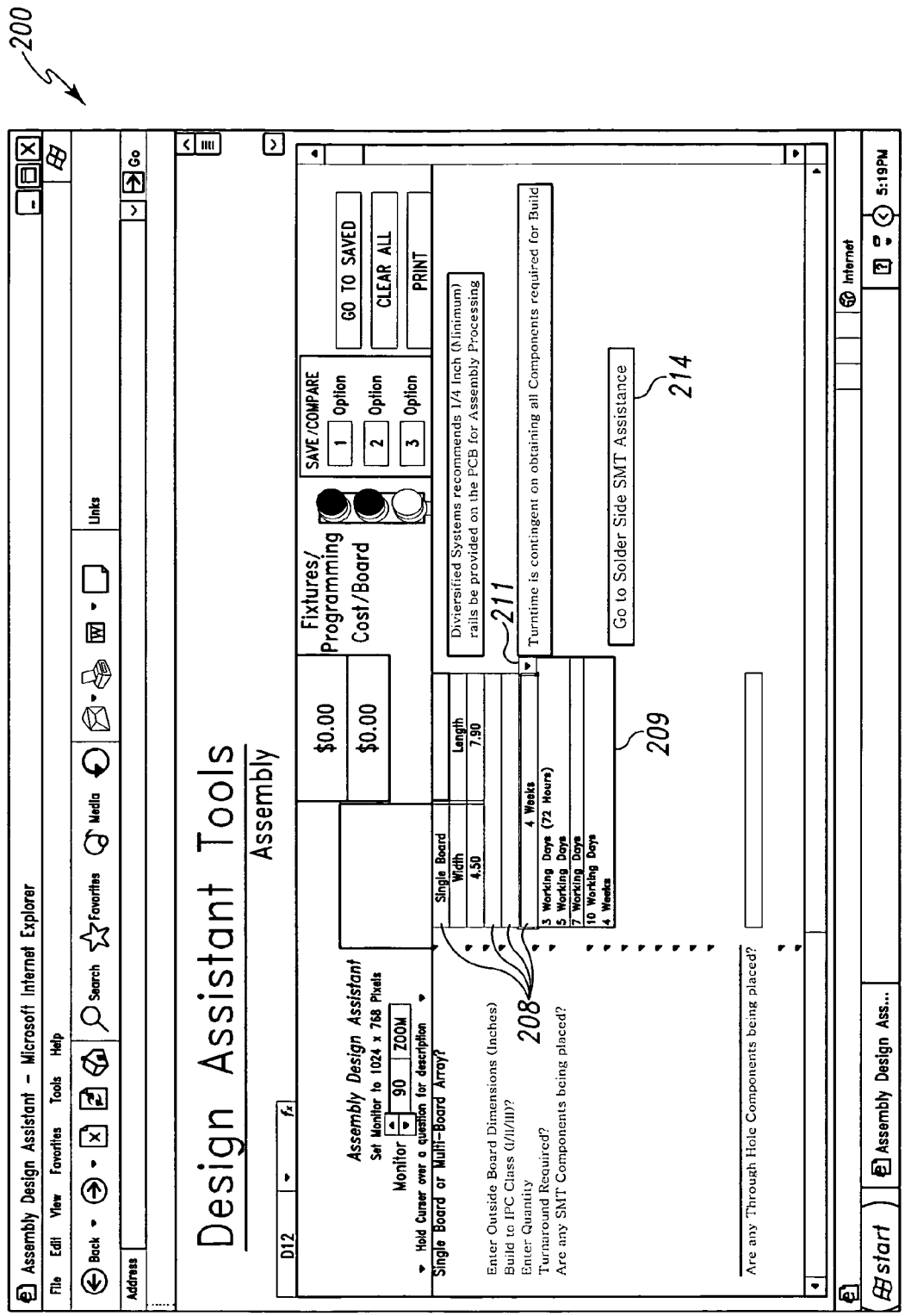
Figure 6:
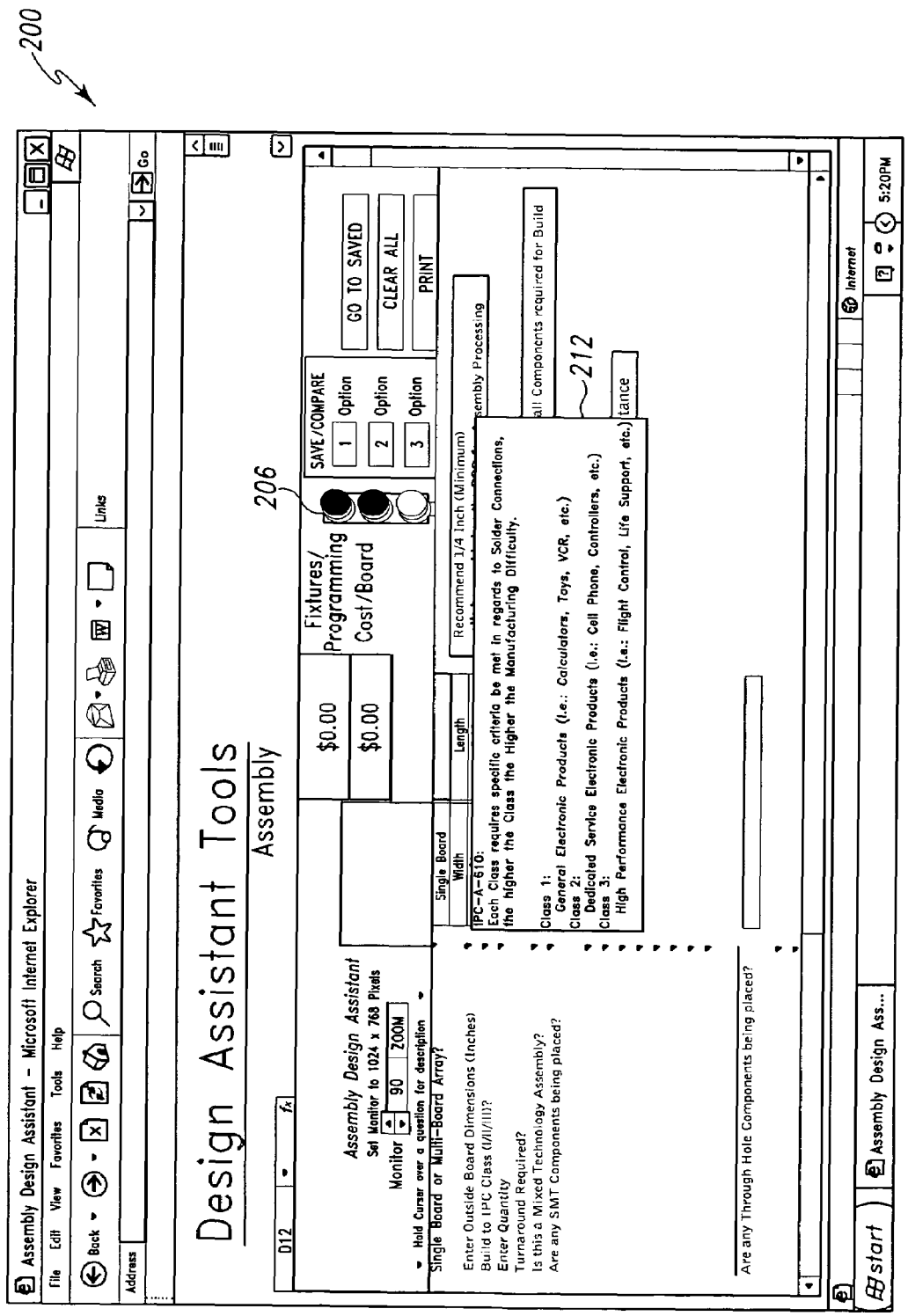

As shown in FIG. 5, data may be entered into the data input fields 208 by direct data input (i.e., the entering of data via a keyboard coupled to the client 14) or by choosing a selection from an associated menu 209 of choices. A menu 209 may be used for data entry in those data input fields 208 in which a restricted range of acceptable values, data, or other choices is desirable to, for example, reduce the possibility of entering incorrect data. To do so, the data input field 208 may be embodied to include a pull-down button 211. Typically, the menu 209 is "hidden" until a user of the application 200 selects the pull-down button 211 to "call up" or otherwise display the menu 209. Once a user has made a selection from the menu 209, the menu 209 is once again "hidden" or otherwise removed from the display of the application 200 and the selected value or menu choice is displayed in the associated data input field 208.

As such, when the designer enters information associated with a given data field 208, the amounts displayed in the cost-per-assembly display 202 and/or the fixture/programming cost display 204 are updated for presentation to the designer. In other words, as the designer enters information into the application 200, the designer gets immediate feedback as to the impact on the cost of the assembly caused by the entered values. Moreover, the designer is provided with feedback as to whether any entered information (or combination of entered information) violates or nearly violates the manufacturer's process capabilities. In particular, in the exemplary embodiment of the user interface application 200 described herein, process compatibility information is displayed in the form of a number of RED, YELLOW, or GREEN banners (not shown) which appear next to a given data field 208. In addition to such banners, the stop light 206 is also used to warn the designer of any potential design problems. In particular, if a data entry in one or more data fields 208 (or combination of entries) violates the board manufacturer's process capability, then a RED banner appears next to the entry listing the violation and the stop light 206 goes to RED. If the data entry is acceptable, but carries a yield or cost penalty, then a YELLOW banner appears next to the entry listing the extra cost item and the stop light 206 goes to YELLOW. If all entries are within the process capability of the board manufacturer, then the banners are GREEN and the stop light 210 goes to GREEN.

Each of the data fields 208 has an associated tutorial box 212 (see FIG. 6) that explains the purpose and type of the entry. The tutorial box 212 for a given data entry field may be "called up" for display or otherwise activated by holding the cursor over the question associated with the data field 208. The tutorial box 212 may contain data entry instructions, recommendations for values or selections, warnings, or other additional information related to the associated question.

Figure 7:
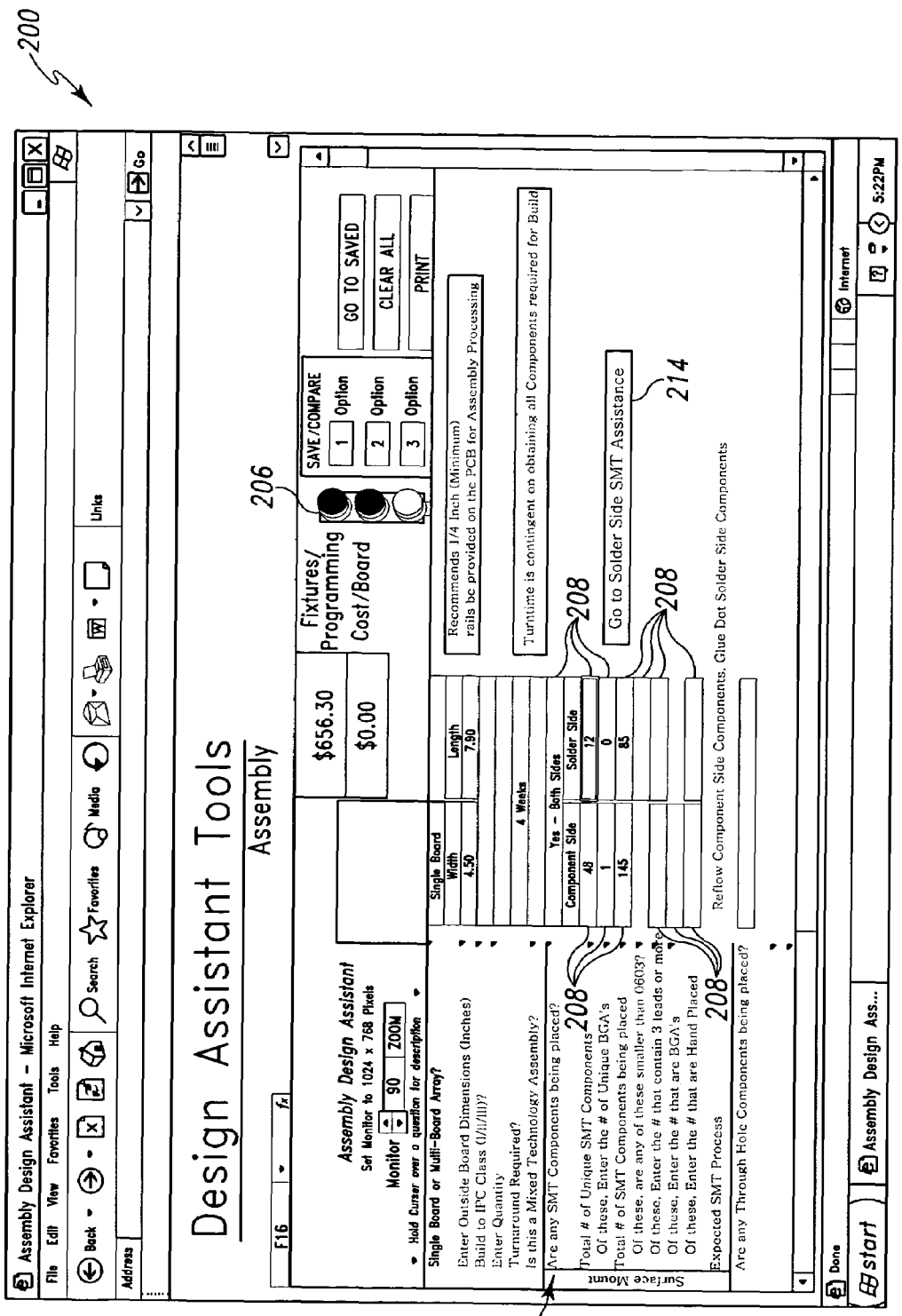
Figure 8:
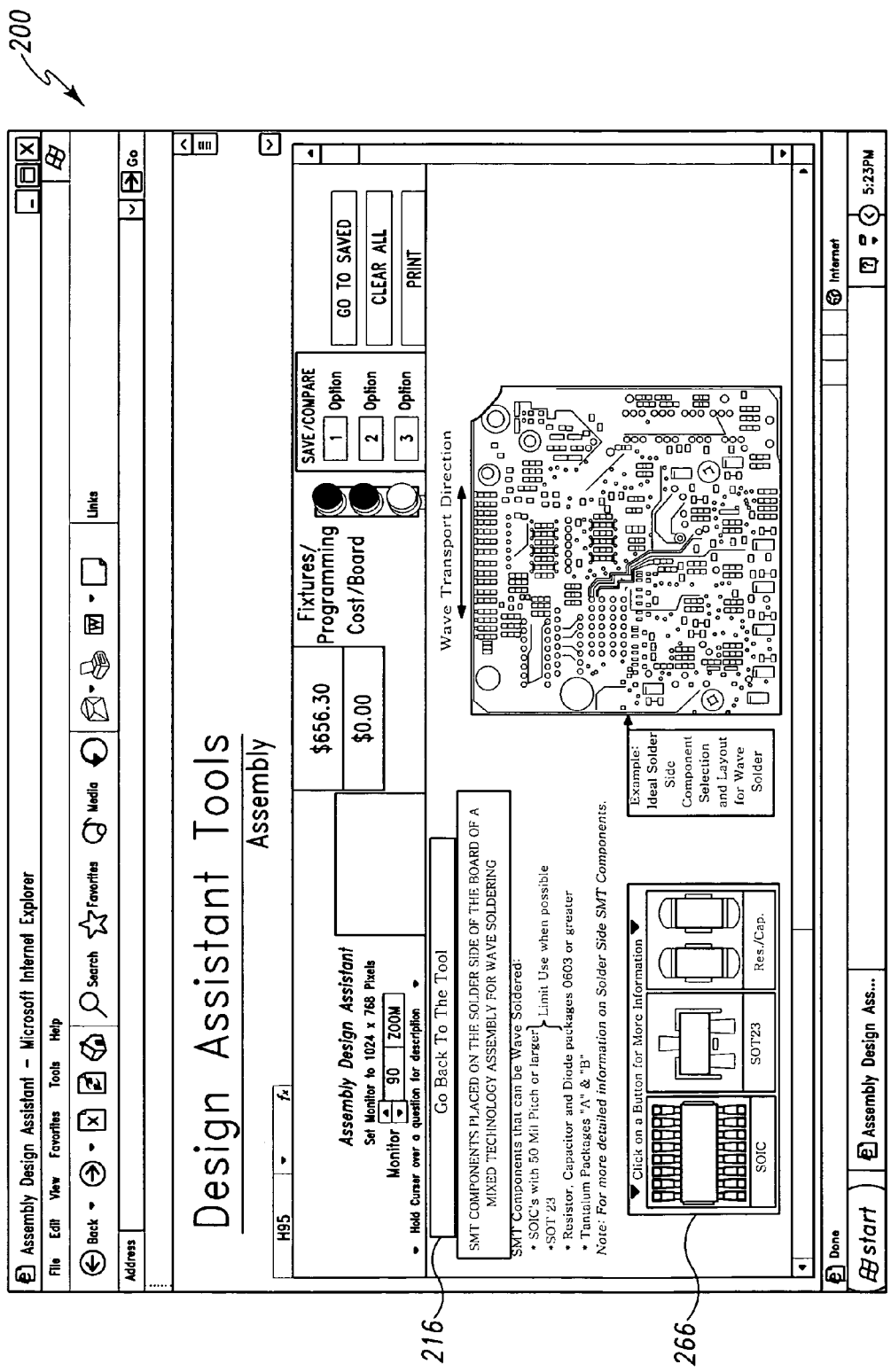
Figure 9:
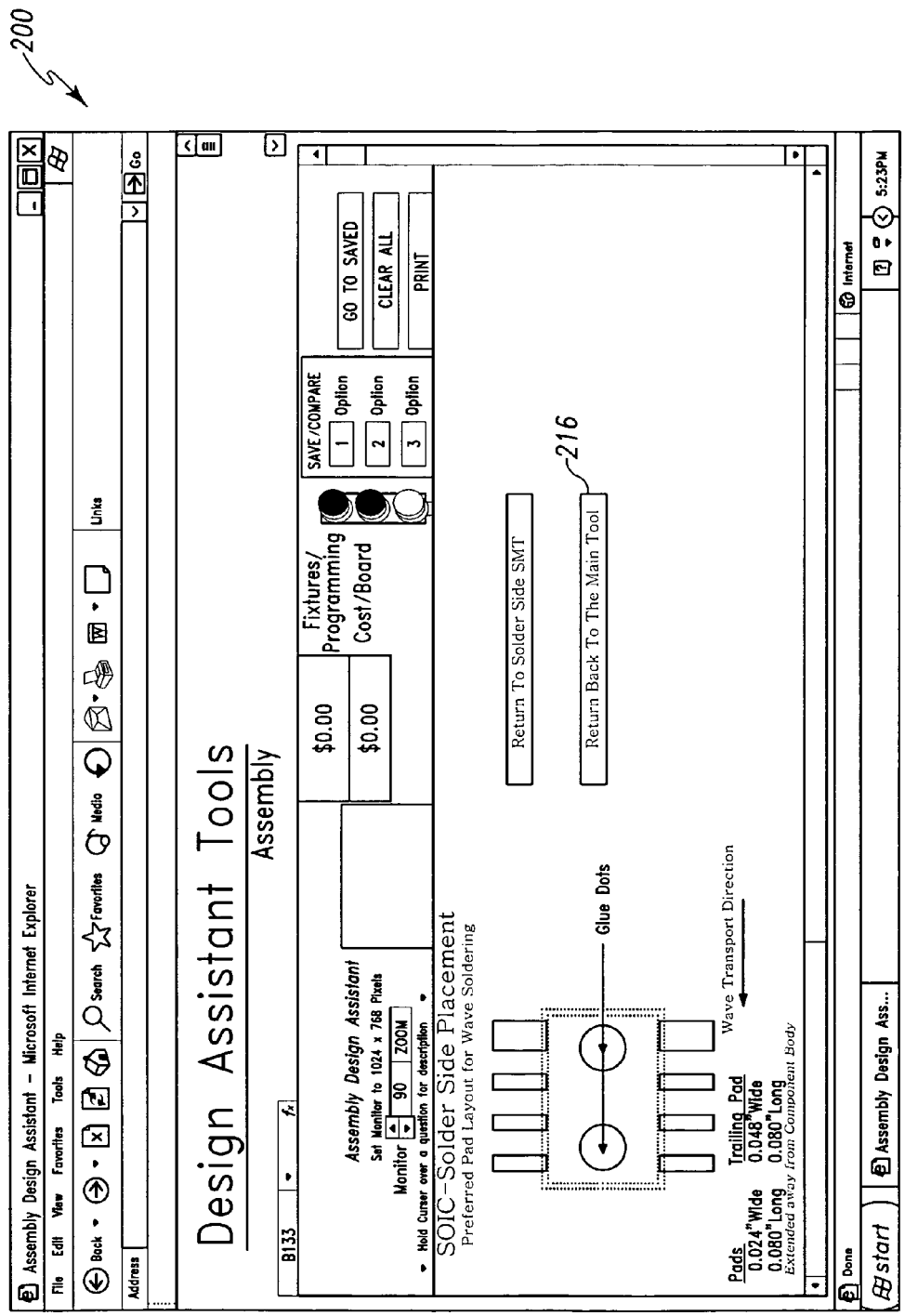

Referring now to FIGS. 4 and 7, some data input fields 208 may not be displayed or otherwise accessible to the designer until the designer has entered data in a related data input field 208. For example, as shown in FIG. 4, additional data input fields 208 related to a question 213 are not initially accessible to the user. However, once the user has entered data in the related data field 208 of FIG. 7, additional data input fields 208 become visible. The user may subsequently enter data related to the question 213 in the now accessible data input fields 208. Further, additional graphics in the form of, for example, a "button" may be used in conjunction with certain data fields 208. This is particularly useful to clarify any questions which may include industry jargon. For example, as shown in FIG. 7, the subject "solder side SMT assistance" has a jump-to graphic in the form of a button 214. When the designer clicks on the button 214, a page or number of pages is/are displayed to the designer which provides technical information relating to the placement of components on the solder side of the board (see FIG. 8) thereby allowing the designer to more fully appreciate the questions being asked. Such information pages may also include graphical illustrations of technical aspects of the assembly process. Additionally, such information pages may include additional jump-to graphics or buttons 266 which when selected by the designer displays a page or number of pages (see FIG. 9) providing additional technical information, recommendations, suggestions or the like to the designer. Once the designer has obtained the information needed to clarify her or his understanding, the designer clicks a return button 216 thereby returning the designer to the main screen of the user interface application 200.

Figure 10:
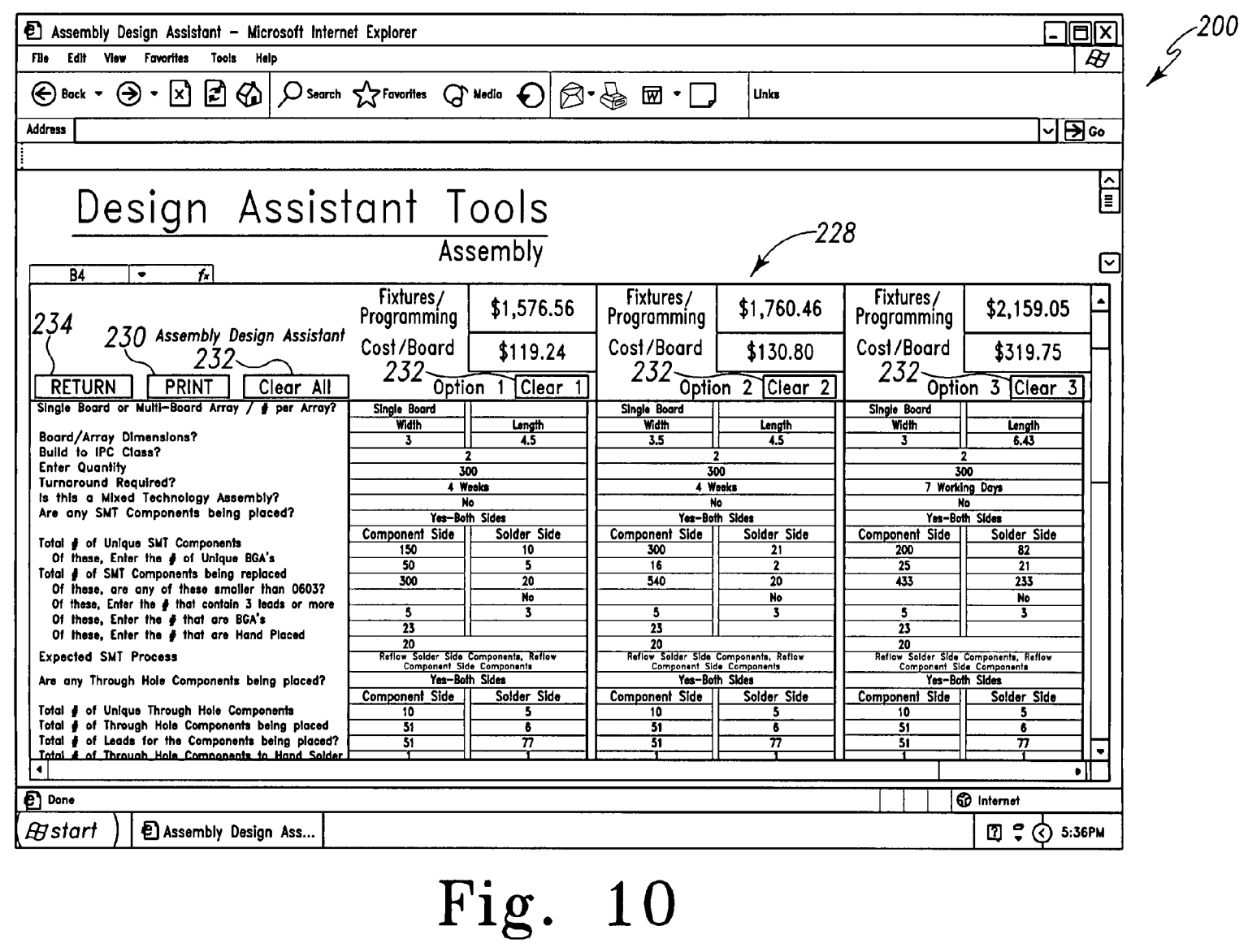

Once the designer has entered a desired amount of information relating to a given design of a electronic assembly, the designer may save the configuration of the design for subsequent comparison to other designs or modifications of the current design. In particular, the designer may click on a "SAVE OPTION 1" button 220 to save the current configuration of the design. The designer may then configure and save, for example, two more configurations by use of a "SAVE OPTION 2" button 222 and a "SAVE OPTION 3" button 224, respectively. Thereafter, if the designer clicks on a "GO TO SAVED" button 226, a summary page 228 is displayed, as shown in FIG. 10. In such a way, multiple design configurations may be viewed side-by-side thereby allowing the designer to compare the impact of her or his changes. The summary page may be printed by use of "PRINT" button 230. Moreover, any one or all of the configurations may be cleared by selecting the appropriate "CLEAR" button 232. Note also that a "PRINT" button and a "CLEAR ALL" button are available on the main page of the user interface application. The summary page 228 also includes a "RETURN" button 234 for returning the designer to the main page of the user interface application 200.

In the exemplary embodiment described herein, the user interface application 200 is designed using a programming language and an associated spreadsheet program such as Visual Basic and Excel which are both commercially available from Microsoft of Redwood, Wash. However, it should be appreciated that the user interface application 200 may be designed using any one of a number of other programming languages, tools, and standards to obtain similar functionality and capabilities of the illustrative user interface application 200.

In summary, the concepts of the present disclosure provide a network-based source of a wide range of information that a design engineer may need to properly perform her or his task. At a base level, it provides the cost of the electronic assembly. However, the designer can play "what if" games with the user interface application and save these scenarios for comparison. These "what if" games may be used to determine the impact of technology or other design-change decisions.

Moreover, in addition to providing the designer with cost information, the concepts disclosed herein also show where the technology goes from easy to hard to impossible (e.g., by use of the Green, Yellow, and Red banners and the stop light).

While the concepts of the present disclosure have been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the apparatus, methods, systems, and programs described herein. It will be noted that alternative embodiments of each of the apparatus, methods, systems, and programs of the present disclosure may not include all of the features described yet still benefit from at least some of the advantages of such features. Those of ordinary skill in the art may readily devise their own implementations of apparatus, methods, systems, and programs that incorporate one or more of the features of the present invention and fall within the spirit and scope of the present disclosure.

For example, although the software concepts disclosed herein are described as already being loaded or otherwise maintained on a computing device (e.g., either a client or server machine), it should be appreciated that the present disclosure is intended to cover the software concepts described herein irrespective of the manner in which such software concepts are disseminated. For instance, the software concepts of the present disclosure, in practice, could be disseminated via any one or more types of a recordable data storage medium such as a modulated carrier signal, a magnetic data storage medium, an optical data storage medium, a biological data storage medium, an atomic data storage medium, and/or any other suitable storage medium.

The invention claimed is:

1. A method for designing an electronic assembly, the method comprising the steps of:
   transmitting a user interface that requests entry of electronic assembly design data,
   receiving user-supplied electronic assembly design data via the user interface,
   retrieving assembly cost data in response to receiving the user-supplied electronic assembly design data from an assembly cost database, the assembly cost data including a materials cost and a processing cost,
   determining a plurality of work centers based on the user-supplied electronic assembly design data, each of the plurality of work centers defining a different manufacturing process step of the electronic assembly,
   determining a per-unit setup cost value and a per-unit run cost value for each work center of the plurality of work centers based on the assembly cost data,
   summing the per-unit setup cost values to determine a total per-unit setup cost,
   summing the per-unit run cost values to determine a total per-unit run cost,
   summing the total per-unit setup cost value and the total per-unit run cost value to determine a total per-unit cost value, and
   updating the user interface to display the total per-unit cost value.

2. The method of claim 1, wherein transmitting a user interface comprises transmitting the user interface to a client machine via a publicly-accessible global network in response 3. The method of claim 1, wherein the user interface application comprises transmitting the user interface application from a server machine to a client machine via the Internet.

4. The method claim 1, wherein transmitting a user interface comprises transmitting an assembly cost database with the user interface from a server machine to a client machine via a publicly-accessible global network.

5. The method of claim 1, wherein receiving user-supplied electronic assembly design data comprises receiving user-supplied electronic assembly design data via an input device of a client machine.

6. The method of claim 1, wherein receiving user-supplied electronic assembly design data comprises receiving user-supplied electronic assembly design data via a publicly-accessible global network.

7. The method of claim 1, wherein retrieving assembly cost data comprises retrieving the assembly cost data from an assembly cost database stored on a client machine in response to the user-supplied electronic assembly design data.

8. The method of claim 1, wherein retrieving assembly cost data comprises retrieving the assembly cost data, via a publicly-accessible global network, from an assembly cost database stored on a server machine in response to a user-supplied electronic assembly design data.

9. The method of claim 1, wherein retrieving assembly cost data comprises includes retrieving the assembly cost data from a server machine via a publicly-accessible global network.

10. The method of claim 1, further comprising retrieving assembly capability data from an assembly capability database in response to the user-supplied electronic assembly design data.

11. The method of claim 10, further comprising updating the user interface on a client machine based on the assembly capability data.

12. The method of claim 11, wherein updating the user interface on a client machine based on the assembly capability data includes displaying a traffic light image to a user.

13. The method of claim 1, further comprising determining a tooling cost value in response to and associated with the user-supplied electronic assembly design data.

14. The method of claim 13, wherein determining a tooling cost value comprises determining a tooling cost value based on the assembly cost data.

15. The method of claim 1, further comprising:
determining a user selected-portion of the user interface,
retrieving an electronic assembly design image based on the user selected-portion, and
displaying the electronic assembly design image on a client machine to the user.

16. A method for designing an electronic assembly, the method comprising the steps of:
transmitting a user interface that requests entry of electronic assembly design data,
receiving user-supplied electronic assembly design data via the user interface,
retrieving assembly capability data that indicates the manufacturing capability of an electronic assembly manufacturer in response to receiving the user-supplied electronic assembly design data from an assembly capability database,
comparing the assembly design data to the assembly capability data to determine whether the assembly design data exceeds the manufacturing capability of the electronic assembly manufacturer, and
displaying indicia on the user interface if the assembly design data exceeds the manufacturing capability of the electronic assembly manufacturer, the indicia being configured to notify a user that the manufacturing capability of the electronic assembly manufacturer has been exceeded.

17. The method of claim 16, wherein transmitting a user interface comprises transmitting the user interface to a client machine via a publicly-accessible global network in response to a user-supplied request received by a server machine via the publicly-accessible global network.

18. The method of claim 16, wherein transmitting a user interface comprises transmitting the user interface from a server machine to a client machine via the Internet.

19. The method claim 16, wherein transmitting a user interface comprises transmitting an assembly capability database with the user interface from a server machine to a client machine via a publicly-accessible global network.

20. The method of claim 16, wherein receiving user-supplied electronic assembly design data comprises receiving user-supplied electronic assembly design data via an input device of a client machine.

21. The method of claim 16, wherein receiving user-supplied electronic assembly design data comprises receiving user-supplied electronic assembly design data via a publicly-accessible global network.

22. The method of claim 16, wherein retrieving assembly capability data comprises retrieving assembly capability data from an assembly capability database stored on a client machine in response to the user-supplied electronic assembly design data.

23. The method of claim 16, wherein retrieving assembly capability data comprises retrieving assembly capability data, via a publicly-accessible global network, from an assembly capability database stored on a server machine based on the user-supplied electronic assembly design data.

24. The method of claim 23, wherein retrieving assembly capability data comprises retrieving the assembly capability data via a publicly-accessible global network.

25. The method of claim 16, wherein updating the user interface comprises displaying a traffic light image to a user.

26. The method of claim 16, further comprising:
determining a user selected-portion of the user interface,
retrieving an electronic assembly design image based on the user selected-portion, and
displaying the electronic assembly design image on a client machine to the user.

27. A method for designing an electronic assembly, the method comprising:
transmitting a user interface that requests entry of electronic assembly design data,
receiving user-supplied electronic assembly design data via the user interface,
retrieving assembly cost data in response to receiving the user-supplied electronic assembly design data from an assembly cost database,
determining a plurality of work centers based on the user-supplied electronic assembly design data, each of the plurality of work centers defining a manufacturing process step of the electronic assembly,
determining a per-unit setup cost value and a per-unit run cost value for each work center of the plurality of work centers based on the assembly cost data,
determining a total per-unit setup cost value and a total per-unit run cost value, determining a total per-unit cost value based on the total per-unit setup cost value and the total per-unit run cost value, retrieving assembly capability data that indicates the manufacturing capability of an electronic assembly manufacturer in response to receiving the user-supplied electronic assembly design data from an assembly capability database, comparing the assembly design data to the assembly capability data to determine whether the assembly design data exceeds the manufacturing capability of the electronic assembly manufacturer; and updating the user interface to display the total per-unit cost value and to notify a user if the assembly design data exceeds the manufacturing capability of the electronic assembly manufacturer.

28. The method of claim 27, wherein transmitting a user interface comprises transmitting the user interface to a client machine via a publicly-accessible global network in response to a user-supplied request received by a server machine via the publicly-accessible global network.

29. The method of claim 27, wherein transmitting a user interface comprises transmitting the user interface from a server machine to a client machine via the Internet.

30. The method claim 27, wherein transmitting a user interface comprises transmitting an assembly cost database and an assembly capability database from a server machine to a client machine via a publicly-accessible global network.

31. The method of claim 27, wherein receiving user-supplied electronic assembly design data comprises receiving user-supplied electronic assembly design data via an input device of a client machine.

32. The method of claim 27, wherein receiving user-supplied electronic assembly design data comprises receiving user-supplied electronic assembly design data via a publicly-accessible global network.

33. The method of claim 27, wherein retrieving assembly cost data comprises retrieving assembly cost data from an assembly cost database stored on a client machine in response to the user-supplied electronic assembly design data.

34. The method of claim 27, wherein retrieving assembly cost data comprises retrieving assembly cost data from an assembly cost database stored on a server machine in response to the user-supplied electronic assembly design data.

35. The method of claim 27, wherein retrieving assembly cost data comprises retrieving the assembly cost data from an assembly cost database via a publicly-accessible global network.

36. The method of claim 27, wherein retrieving assembly capability data comprises retrieving assembly capability data from an assembly capability database stored on a client machine in response to the user-supplied electronic assembly design data.

37. The method of claim 27, wherein retrieving assembly capability data comprises retrieving assembly capability data from an assembly capability database stored on a server machine in response to the user-supplied electronic assembly design data.

38. The method of claim 27, wherein retrieving assembly capability data comprises retrieving the assembly capability data from an assembly capability database via a publicly-accessible global network.

39. The method of claim 27, wherein updating the user interface comprises displaying a traffic light image to a user.

40. The method of claim 27, further comprising determining a tooling cost value in response to and associated with the user-supplied electronic assembly design data.

41. The method of claim 40, wherein determining a tooling cost value comprises determining a tooling cost value based on the assembly cost data.

42. An article comprising a computer-readable signal-bearing medium having therein a plurality of instructions which, when executed by a processor, cause the processor to:

display a user interface that requests entry of electronic assembly design data to a user, retrieve assembly cost data in response to receiving user-supplied electronic assembly design data from an assembly cost database, determine a plurality of work centers based on the user-supplied electronic assembly design data, each of the plurality of work centers defining a different manufacturing process step of the electronic assembly, determine a per-unit setup cost value and a per-unit run cost value for each work center of the plurality of work centers based on the assembly cost data.

determine a total per-unit setup cost value and a total per-unit run cost value, determine a total per-unit cost value based on the total per-unit setup cost value and the total per-unit run cost value, retrieve assembly capability data that indicates the manufacturing capability of an electronic assembly manufacturer in response to receiving the user-supplied electronic assembly design data from an assembly capability database, compare the assembly design data to the assembly capability data to determine whether the assembly design data exceeds the manufacturing capability of the electronic assembly manufacturer; and update the user interface to display the total per-unit cost value and to notify a user if the assembly design data exceeds the manufacturing capability of the electronic assembly manufacturer.

43. The article of claim 42, wherein the plurality of instructions, when executed by the processor, further cause the processor to retrieve the assembly cost data from the assembly cost database via a publicly-accessible global network.

44. The article of claim 42, wherein the plurality of instructions, when executed by the processor, further cause the processor to retrieve the assembly capability data from the assembly capability database via a publicly-accessible global network.

* * * * *